United States Patent
Henig

(10) Patent No.: US 8,230,148 B2
(45) Date of Patent: Jul. 24, 2012

(54) SYSTEMS AND METHODS FOR EMBEDDING INTERRUPTS INTO A SERIAL DATA STREAM

(75) Inventor: Robert Henig, Palo Alto, CA (US)

(73) Assignee: Redwood Systems, Inc., Fremont, CA (US)

(*) Notice: Subject to any disclaimer, the term of this patent is extended or adjusted under 35 U.S.C. 154(b) by 0 days.

(21) Appl. No.: 13/082,957

(22) Filed: Apr. 8, 2011

(65) Prior Publication Data

US 2011/0185096 A1  Jul. 28, 2011

Related U.S. Application Data

(63) Continuation-in-part of application No. 12/609,695, filed on Oct. 30, 2009, now abandoned.

(51) Int. Cl.
*G06F 13/24* (2006.01)
(52) U.S. Cl. ......................... 710/260; 315/153
(58) Field of Classification Search .......... 315/149–159; 710/260–263
See application file for complete search history.

(56) References Cited

U.S. PATENT DOCUMENTS

| | | | |
|---|---|---|---|
| 2007/0005858 A1* | 1/2007 | Shah et al. | 710/200 |
| 2008/0016265 A1* | 1/2008 | Oshikiri et al. | 710/309 |
| 2011/0031897 A1 | 2/2011 | Henig et al. | 315/297 |

OTHER PUBLICATIONS

U.S. Appl. No. 12/609,695, filed Oct. 30, 2009, Henig.

* cited by examiner

*Primary Examiner* — Clifford Knoll
(74) *Attorney, Agent, or Firm* — Brinks Hofer Gilson & Lione

(57) ABSTRACT

Systems and methods for transmitting and processing interrupts by embedding interrupt information into a serial data stream are disclosed. An event is detected and converted into an interrupt signal. The interrupt signal is converted into a special interrupt character or symbol sequence. The special interrupt character or symbol sequence is embedded into a serial data stream at the next available character or symbol boundary and transmitted to a receiving controller. The receiving controller strips the special interrupt character or symbol sequence from the serial data stream and raises a corresponding interrupt. The receiving controller processes the interrupt by interrupting normal processing to run an interrupt subroutine. Once the receiver has detected and raised an interrupt, it can return an acknowledgement character or symbol sequence by the same mechanism. The transmitter can repeat the interrupt embedding and transmission if it fails to receive the acknowledgement within a predetermined period of time.

14 Claims, 2 Drawing Sheets

SYSTEMS AND METHODS FOR EMBEDDING INTERRUPTS INTO A SERIAL DATA STREAM

This application is a continuation-in-part application of, and claims priority under 35 U.S.C. §120 to, U.S. patent application Ser. No. 12/609,695, "SYSTEMS AND METHODS FOR EMBEDDING INTERRUPTS INTO A SERIAL DATA STREAM" filed Oct. 30, 2009, the entire contents of which are incorporated by reference.

FIELD OF THE INVENTION

One or more embodiments of the present invention relate to implementing the functionality of interrupts without the use of dedicated lines for the interrupts.

BACKGROUND

Lighting systems for areal illumination typically comprise (1) a set of "luminaires" (light fixtures comprising mounting hardware and one or more light-emitting elements such as incandescent or fluorescent bulbs or arrays of light-emitting diodes [LEDs]), together with (2) one or more sensor elements (motion sensors, light sensors, and the like), (3) control devices (such as dimmers and switches), and (4) power drivers to set the output light level of each luminaire as a function of sensor outputs and control device settings. Such systems can range in complexity from a single wall switch and bulb to commercial building lighting systems comprising hundreds of luminaires, sensors, and control devices. An example of such a lighting system for commercial building lighting is disclosed in co-owned and co-pending U.S. patent application Ser. No. 12/538,806 which is incorporated herein by reference.

Sensor devices such as motion sensors often sit quiescent for extended periods of time and change state only for brief periods of activity. Control systems may need to respond rapidly to these "events," but it is undesirable for a control system to use resources to continually check for the occurrence of an event. For this reason, digital control systems that use such sensors often respond to these sensors via "interrupts." That is, instead of continually polling the sensor to check for an event (and thereby wasting potentially valuable computational resources), the sensor device is configured to generate an "interrupt" signal, typically wired to a dedicated terminal on the controller. Only when an interrupt signal is received does the controller take any action with respect to the sensor (such as, for example, turning on one or more lights in response to detected motion). Typically, a specific interrupt response subroutine is run as soon as possible when the interrupt is received, interrupting any other data processing that may otherwise be in progress. Response to interrupts is often time-critical, and it can be important to respond as nearly as possible in "real time." If there are multiple possible interrupts requiring response, an interrupt queue may be established, and interrupts are typically processed on a first-in-first-out basis from the interrupt queue, with normal data processing resuming when the queue is empty and all currently active interrupts have been processed.

Another example of a special activity embedded within normal processing can be found in the use of "escape sequences" or "control sequences." These were first used in digital text communications devices where such escape sequences were used to embed non-printing functionality such as device control, font changes, or other mode changes into a character stream. Characters that were to be interpreted with a special meaning such as "change to italic font" were preceded and/or followed by a special character to indicate the special interpretation. The use of escape sequences was subsequently adopted in digital communications with all sorts of physical devices to embed special control functions and modal changes into normal data streams. Note that escape sequences are not interrupts. They implement mode changes that change the interpretation of particular characters in a character data stream, but they are not in any way event-driven. Escape character are inserted in an orderly fashion to indicate that, after processing one set of characters, a mode change should then be implemented to process the next set of characters. Interrupts, on the other hand, are used to process asynchronous events that can occur independently of "normal" data transmission and processing.

Another particular example of control sequences is the use of "XON/XOFF" for software control of data flow. When the receiving end of a data link is incapable of processing incoming data as fast as the transmitting end is capable of sending it, the receiving end sends "XOFF" to the transmitting end which then temporarily suspends data transmission until it is ready to accept data again, at which time the receiving end sends "XON" to indicate that it is again ready to accept data. For example, a computer may be able to send data to a serial printing device much faster than the device can format the data and output it to paper. The printing device may include a buffer to store data ahead, but even that buffer may have a finite capacity which can be exceeded when data is being transmitted faster than the buffer can be emptied. When the buffer is full, the printer transmits "XOFF" to indicate that it can no longer accept data; when there is again sufficient space in the buffer to store data, the printer transmits "XON," and the source computer resumes transmission of data.

SUMMARY OF THE INVENTION

Systems and methods for transmitting and processing interrupts by embedding interrupt information into a serial data stream are disclosed. An event is detected and converted into an interrupt signal. The interrupt signal is converted into a special interrupt character or symbol sequence. The special interrupt character or symbol sequence is embedded into a serial data stream at the next available character or symbol boundary and transmitted to a receiving controller. The receiving controller strips the special interrupt character or symbol sequence from the serial data stream and raises a corresponding interrupt. The receiving controller processes the interrupt by interrupting normal processing to run an interrupt subroutine. Once the receiver has detected and raised an interrupt, it can return an acknowledgement character or symbol sequence by the same mechanism. The transmitter can repeat the interrupt embedding and transmission if it fails to receive the acknowledgement within a predetermined period of time.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Before the present invention is described in detail, it is to be understood that unless otherwise indicated this invention is not limited to specific sensor devices, electronic components, or the like, as such may vary. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a fixture" may include two or more fixtures; reference to "a sensor" may include two or more sensors, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Embodiments of the present invention can be used with various supersets and subsets of the exemplary components described herein. For concreteness, embodiments of the invention will be described in the context of a commercial building illumination system comprising a set of LED luminaires, but the invention is not limited to the use of LEDs as light sources nor to use in building illumination systems. Any system that uses interrupts generated remotely from a control processor can make use of the present invention. Other exemplary systems include industrial controls, environmental controls, traffic control, water distribution systems, and the like. Interrupt signals can be generated by sensors of all sorts as well as timers and any other device that can generate an "event" at a particular time.

Figure 1:
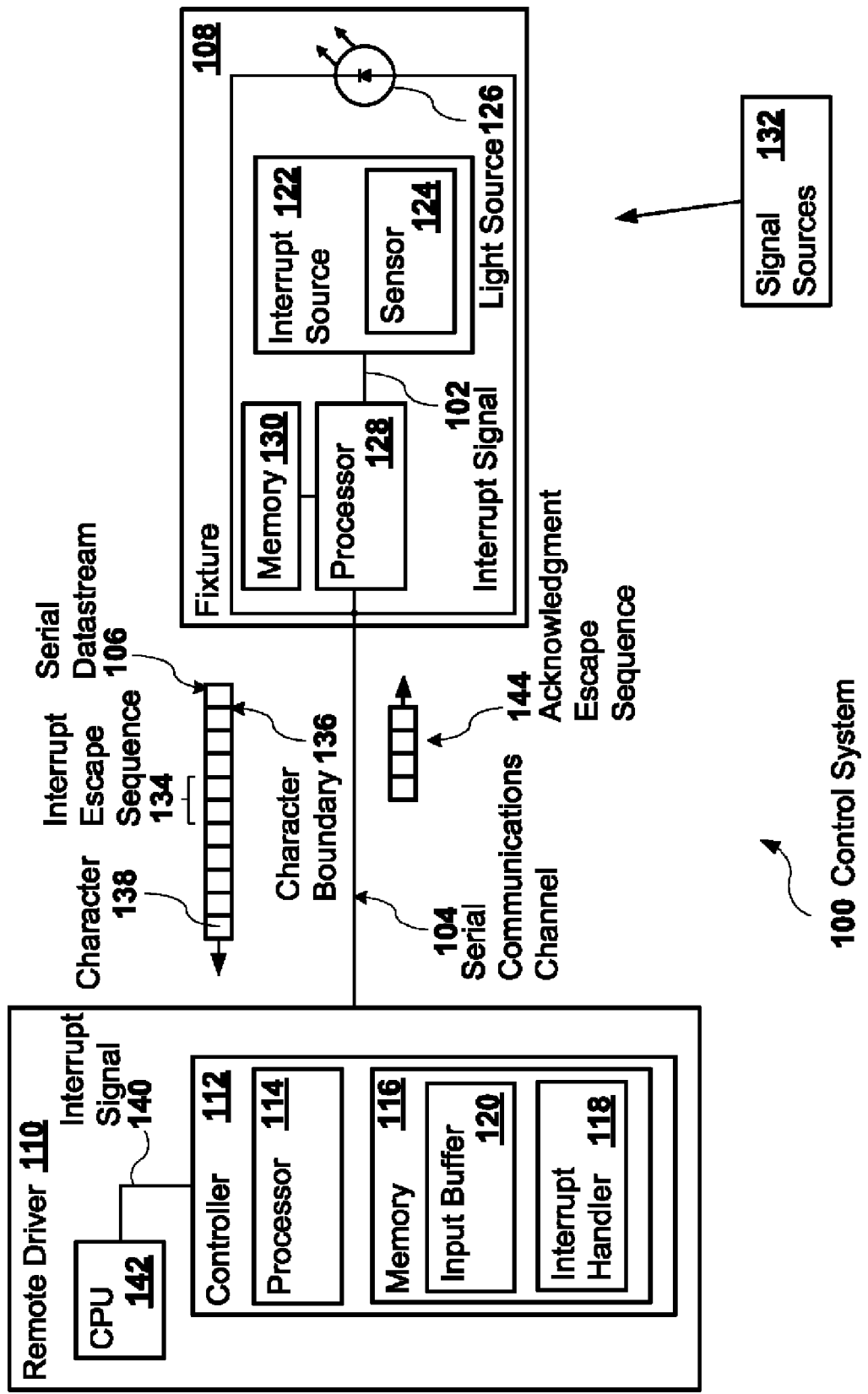
FIG. 1 illustrates an example of a control system that detects an interrupt signal over a serial communications channel that transports a serial datastream.

FIG. 1 illustrates an example of a control system 100 that detects an interrupt signal 102 over a serial communications channel 104 that transports a serial datastream 106. The control system 100 may include two devices, such as a fixture 108 and a remote driver 110, which communicate with each other over the serial communications channel 104. The system 100 may include additional, fewer, or different components. For example, the system 100 may include multiple fixtures. In one example, the system 100 may include a controller 112 instead of the remote driver 110.

The remote driver 110 may be any device or combination of devices that powers one or more fixtures, such as the fixture 108 illustrated in FIG. 1, and communicates with the fixtures and/or devices electrically coupled to remote driver 110. The remote driver 110 may provide power to one or more of the fixtures over a pair of conductors. The remote driver 110 may provide power to, and communicate over, the same conductors. Alternatively or in addition, the remote driver 110 may communicate over different conductors than are used to power the respective fixtures.

The controller 112 may be a component that receives the serial datastream 106 over the serial communications channel and detects the interrupt signal 102 encoded in the serial datastream 106. The controller 112 may include a processor 114 and a memory 116.

The memory 116 may include any now known, or later discovered, data storage device, component or combination thereof. The memory 116 may include non-volatile and/or volatile memory, such as a random access memory (RAM), a read-only memory (ROM), an erasable programmable read-only memory (EPROM), flash memory, or any other type of electronic storage component or combination thereof. Alternatively or in addition, the memory 116 may include an optical, magnetic (hard-drive) or any other form of data storage device.

The processor 114 may include a microcontroller, a general processor, a central processing unit, a server, an application specific integrated circuit (ASIC), a digital signal processor, a field programmable gate array (FPGA), a digital circuit, an analog circuit, or combinations thereof. The processor 114 may be operable to execute computer executable instructions or computer code embodied in the memory 116 or in other memory to implement the functionality of the controller 112. The computer code may include instructions executable with the processor 114. The computer code may be written in any computer language now known or later discovered, such as C++, C#, Java, Pascal, Visual Basic, Perl, HyperText Markup Language (HTML), JavaScript, assembly language, and any combination thereof. In one example, the memory 116 may include an operating system, such as LINUX®, a registered trademark of individual, William Croce of Boston, Mass.

The memory 116 may hold the programs and processes that implement the logic described herein for execution by the processor 114. For example, the memory 116 may include an interrupt handler 118. The memory 116 may include supporting structures, such an input buffer 120 used to buffer data received in the serial datastream 106.

Embodiments of the present invention are directed to providing the equivalent of interrupt functionality using only an available serial communications channel to communicate the occurrence of an event from a remote sensor device to a controller. In the example illustrated in FIG. 1, the available serial communication channel may include the serial communications channel 104, and the remote sensor device may include the fixture 108. An exemplary implementation is provided using motion sensors that are part of a lighting system.

Generally, a "lighting system" according to one or more embodiments of the present invention comprises a set of "fixtures," and at least one remote driver, such as the remote driver 110 illustrated in FIG. 1, which collects information from a set of sensors and controls and sets the output light level for each light source (which may vary from zero to maximum—a non-zero light level that is limited by a maximum sustainable operating point for the light source). As used herein, a "fixture," such as the fixture 108 illustrated in FIG. 1, can be a luminaire, or a standalone control or sensor; a "luminaire" is a light fixture including a light source 126 plus suitable mounting hardware. In particular embodiments of the present invention, luminaires can further include light sensors designed to sense light from the light sources of adjacent luminaires (either via direct transmission or via reflection from the area under illumination) and additional signal sources 132 and matching sensors using other wavelengths of light or other signal source/sensor technologies. For example, the fixture 108 may include an interrupt source 122, such as a sensor 124, the light source 126, a processor 128, and a memory 130. The interrupt source 122 may include any electronic circuitry or device that generates the interrupt signal 102. For example, the interrupt source 122 may include the sensor 124 and circuitry to process one or more signals generated by the sensor 124. The interrupt signal 102 may be an asynchronous hardware interrupt that indicates an event occurred in, or is detected by, the interrupt source 122. The processor 128 and the memory 130 may include any processor and memory, such as the processor 114 and the memory 116 in the controller 112. The processor 128 of the fixture 108 may receive the interrupt signal 102 from the interrupt source 122 over a line.

The lighting system further comprises communications means to allow each fixture to communicate with the control system. Such means can include direct wired connections, or any other known communications means such as optical fibers, wireless (radio frequency), ultrasonic, infrared, etc. For example, the communications means may include the serial communications channel 104.

In certain embodiments, additional signal sources 132 using various technologies such as radio frequency antennas; infrared, ultraviolet, or visible light sources; or ultrasonic emitters can also be provided. Such additional signal sources 132 can provide means for measuring a variety of quantities useful for providing input to a lighting control system. Such quantities include motion, daylight, equipment-on status, presence of people, sound and noise, and the like. Sensors, such as the sensor 124 in the fixture 108, capable of receiving signals from the signal source(s) 132 are also provided. For example, if the luminaire light source 126 is the sole signal source provided, then an optical sensor such as a photodiode, phototransistor, or photoresistor built into the luminaire can be used as a suitable sensor. As another example, if an ultrasonic emitter is built into each luminaire, then an ultrasonic detector can be built into each luminaire to receive and detect the emitted ultrasonic signals. Further, each luminaire is associated with a microcontroller or more generally, the processor 128, which serves as a luminaire controller. The microcontroller is capable of transmitting the output of the sensor 124 or sensors to the remote driver 110. In certain embodiments, the microcontroller is also capable of controlling the light source 126 or one or more of the installed signal sources, although typically it is not capable of directly controlling the power to the luminaire's main light source 126, which is controlled instead by the remote driver 110. Microcontrollers can be dedicated to single luminaires or shared among two or more fixtures.

An example of a non-luminaire fixture in a lighting system is a fixture comprising a motion sensor, suitable control electronics, and a microcontroller capable of communicating with the remote driver 110.

In accordance with one or more embodiments of the present invention, the remote driver 110 is connected to a set of fixtures including luminaires and sensors via serial communications channels such as wires, and no separate lines are available for communicating interrupt signals from sensors to the remote driver. The remote driver 110 may include the controller 112 that can manage communications with the set of fixtures and perform suitable control functions, for example, to set light levels according to algorithms based on sensor data, control settings, and time.

It is desirable for a control system 100 to minimize the latency (time delay before action) of interrupt processing. It is therefore desirable to communicate the interrupt 102 to the controller 112 as nearly as possible in "real time," and, in turn, it is desirable that the controller 112 be cable to interrupt other activities to respond to the interrupt 102 as quickly as possible. In accordance with one or more embodiments of the present invention, the fixture 108 (such as a motion sensor assembly) that needs to transmit the interrupt signal 102 to the controller 112 transmits a specific predefined sequence of characters (an "interrupt escape sequence" 134) at the next possible character boundary. (A "character boundary" 136 occurs after the end of transmission of each character 138. For example, if characters are encoded in bytes, then character boundaries correspond to byte boundaries.) Any suitable string of one or more characters may be used as the interrupt indicator as long as it can be uniquely distinguished from all other character strings that might be transmitted as data. In one example, the interrupt escape sequence 134 may include an escape character and an interrupt character. For example, using 8-bit ASCII character encoding, 0x1B (hexadecimal 1B, equivalent to decimal 27) is commonly used as the "escape" character. If one further defines 0x18 as the "interrupt character," then the interrupt escape sequence 134 can be defined as the two characters, 0x1B 0x18. If there is no need to encode and process any other escape sequences besides the interrupt escape sequence 134, then a single-character interrupt escape sequence can be used.

Using the example of a motion sensor for a lighting system, a microcontroller or the processor 128 associated with the motion sensor in the fixture 108 can be configured to routinely transmit, at regular intervals, status information (a device ID plus device health status, and sensor signal level, for example) as a character string. When the motion sensor electronics in the interrupt source 122 indicate that an interrupt is needed (because, for example, the sensor signal level crossed over a preset threshold value), the transmission of the character string is interrupted at the next character boundary 136, and the interrupt escape sequence 134 is embedded into the character string of the serial datastream 106.

In accordance with one or more embodiments of the present invention, at the receiving end, the controller 112 monitors the received character string for interrupt escape sequences, strips the interrupt escape sequences out of the character string in progress, and raises an interrupt. For example, the controller 112 may generate an interrupt signal 140 that is received by a central processing unit (CPU) 142. Alternatively or in addition, the controller 112 can then take any appropriate action needed to respond to the interrupt event, such as executing the interrupt handler 118, while continuing to place the rest of the character string in the input buffer 120 for appropriate processing after the interrupt response action is complete. For example, if the interrupt event is motion detection, then "appropriate processing" may comprise turning on one or more light fixtures to a predetermined level.

In accordance with one or more embodiments of the present invention, the receiving controller 112 also immediately returns an acknowledgement escape sequence 144 to the sending device, such as the fixture 108. If the sending device does not receive the acknowledgement sequence 144 within a predetermined time interval (i.e., a time sufficient for the interrupt to be received and acknowledged), the interrupt escape sequence 134 is retransmitted. The acknowledgement escape sequence 144 is similarly embedded as an interrupt escape sequence at the first available character boundary 136 in the event that any character string is being transmitted to the sending device at the time. The microcontroller or processor 128 at the sending device monitors any received character string for escape sequences, strips the escape sequences out, and raises an acknowledgement interrupt that is used to prevent retransmission of the original interrupt escape sequence 134.

The timing details and the length of the predetermined time interval depend on the bandwidth of the communications.

This can be illustrated with the following example, whose specific numbers can be varied as appropriate for the bandwidth of particular serial communications protocols. Suppose the communications occur via a full-duplex 1 kbaud communications channel. Each bit takes 1 ms to transmit. Using 8-bit character encoding, and a two-character escape sequence, 16 bits are required to transmit an interrupt, and the minimum interrupt latency is 16 ms. Since the interrupt escape sequence 134 must be inserted on a byte boundary, an additional delay of up to a full byte or 8 ms could be needed to wait for the next byte boundary. In this example, it could take up to 24 ms for the interrupt signal 102 to be encoded and transmitted to the controller 112. (Additional latencies in the hardware are likely to be much shorter than these communication delays.)

Once transmitted, the originator of the interrupt must wait an appropriate amount of time for an acknowledgment. Assuming full duplex communications at the same baud rate for both directions, the return path has the same latency as the path to the controller 112. Thus, the worst case latency for receiving an acknowledgement interrupt is also 24 ms as measured from the completion of the transmission of the original interrupt escape sequence 134 (plus any processing delays that must be accounted for).

When a motion sensor detects motion, the motion may continue for an extended period of time. If the sensor electronics in the interrupt source 122 are configured to generate the interrupt signal 102 whenever motion is detected, then there is a need to limit the embedding of corresponding escape sequences so that the escape sequences do not clog the data transmission channel or serial communications channel 104 and overwhelm the controller 112 with redundant interrupts. In accordance with one or more embodiments of the present invention, when a sensor device, such as the fixture 108, transmits an interrupt, the sensor device first waits for an acknowledgement, and if the acknowledgement is properly received within the predetermined time interval, the sensor device disables transmission of further escape sequences corresponding to new interrupts until the receiving controller 112 sends a re-enablement signal via another escape sequence. This is conceptually similar to the XON/XOFF method of controlling data transmission described above in the Background section, but is newly applied in the instantly described invention to the control of the transmission of escape sequences representing interrupt events.

The time delay for the re-enablement interrupt can be set conveniently with respect to the need to respond to additional interrupts to fit particular applications. For example, for motion sensors in lighting systems, it can be convenient to consider the overall motion timeout. If a light or lights are to be programmed to turn off after ten minutes of no-motion detected in a workspace, then disabling motion interrupts for 10 sec yields a worst case error on the timeout of 10 sec, which would generally be acceptable. If motion is still ongoing, new motion interrupts would be generated only every 10 sec, thereby requiring minimal overhead to process the recurring interrupts.

In accordance with one or more embodiments of the present invention, the interrupt latency can be further reduced by encoding the interrupt as "symbols" rather than byte-length characters. In this embodiment, the bits of regular data are also encoded into "symbols." For example and without limitation, if each regular data bit is encoded into a two-bit symbol, a regular data 1 can be encoded as a symbol 10, while a regular data 0 can be encoded as a symbol 01. Interrupts can then be inserted directly in the data stream at any point as long as they are represented by their own unique symbols. Depending on the communications protocol, various encodings are possible as illustrated by the following examples.

In accordance with one or more embodiments of the present invention, the serial communications channel 104 may include a synchronous serial communications channel. The receiver always knows where symbol boundaries are, because the receiver clock is always synced with the transmitter clock. (Note that, in this context, the terms "transmitter" and "receiver" refer to the originator and detector of a particular datastream transmission. These may be either the sensor microprocessor or the controller processor in that communications can be bidirectional.) In this instance, interrupts can be inserted into the data stream at any symbol boundary by using a unique interrupt symbol or symbols. For example, the start of interrupt data could be indicated by the two-bit symbol 11. Interrupt data would follow, then a stop symbol 00 after which normal data transmission would resume. Alternatively, the symbols 11 and 00 could be used to represent interrupt data 1 and interrupt data 0 respectively. Since these symbols are unique (i.e., different from the data symbols 10 and 01, the interrupt data symbols and regular data symbols forming disjoint sets), they can always be uniquely distinguished from regular data, and interrupt data can be freely interleaved with regular data on symbol boundaries. The receiver simply diverts interrupt data into a separate buffer for separate processing.

In accordance with one or more embodiments of the present invention, longer symbols can also be used for interrupt data. For synchronous communications, with interrupt symbols always inserted on symbol boundaries, an even number of bits should be used, and symbols should be selected so that interrupt symbols can always be uniquely identified and separated from data symbols. For example, using four-bit interrupt symbols, one can use the symbols 0000, 0011, 1100, and 1111. These could be used to represent four different types of interrupts, or they could be used to encode interrupt data bits.

In accordance with one or more embodiments of the present invention, interrupt symbols are inserted on any bit boundary, either between symbols or within a symbol. In this case, interrupt symbols with an odd number of bits (typically three) can be advantageous. For example, interrupt data 1 can be represented by 111 and interrupt data 0 can be represented by 000. A stream of regular data encoded with the symbols 01 and 10 without interrupts always comprises strings of either one or two consecutive 1s or 0s. Thus a receiver can always extract any strings of three 1s or 0s and put appropriate bits into an interrupt data buffer.

In accordance with one or more embodiments of the present invention, an asynchronous serial data communications channel is provided. The data and interrupt symbol encoding methods described above can all be used, but there is a need to provide a mechanism to determine symbol boundaries for regular data. A "start" and/or "stop" symbol can be used to indicate the beginning and/or end of a packet of data. For example, a start symbol 1111 or 11111111 could be used. The receiver would not process any data until it received a start symbol which it could further use to establish the data transmission rate for that packet of data by timing the duration of the start symbol or measuring the time between bits in the start symbol. Once a packet of data is started, regular data and interrupt data can be freely interleaved on either bit or symbol boundaries according to the type of interrupt symbols used.

The use of symbol encoding of regular data slows the net transmission rate. For example, the use of two-bit symbols would double the number of bits that need to be transmitted for every packet of data. However, interrupt latency can be considerably reduced. Using the full-duplex 1 kbaud communications channel example discussed above, and an example system where interrupts comprising four bits (either one four-bit symbol, or two two-bit symbols) are inserted on two-bit symbol boundaries, the maximum latency for one-way interrupt transmission is reduced from 24 ms to 6 ms (4 ms for the interrupt symbol(s) plus up to 2 ms waiting for the next symbol boundary). For applications where the interrupt latency is more important that the regular data transmission rate, this can be a good tradeoff to make.

Figure 2:
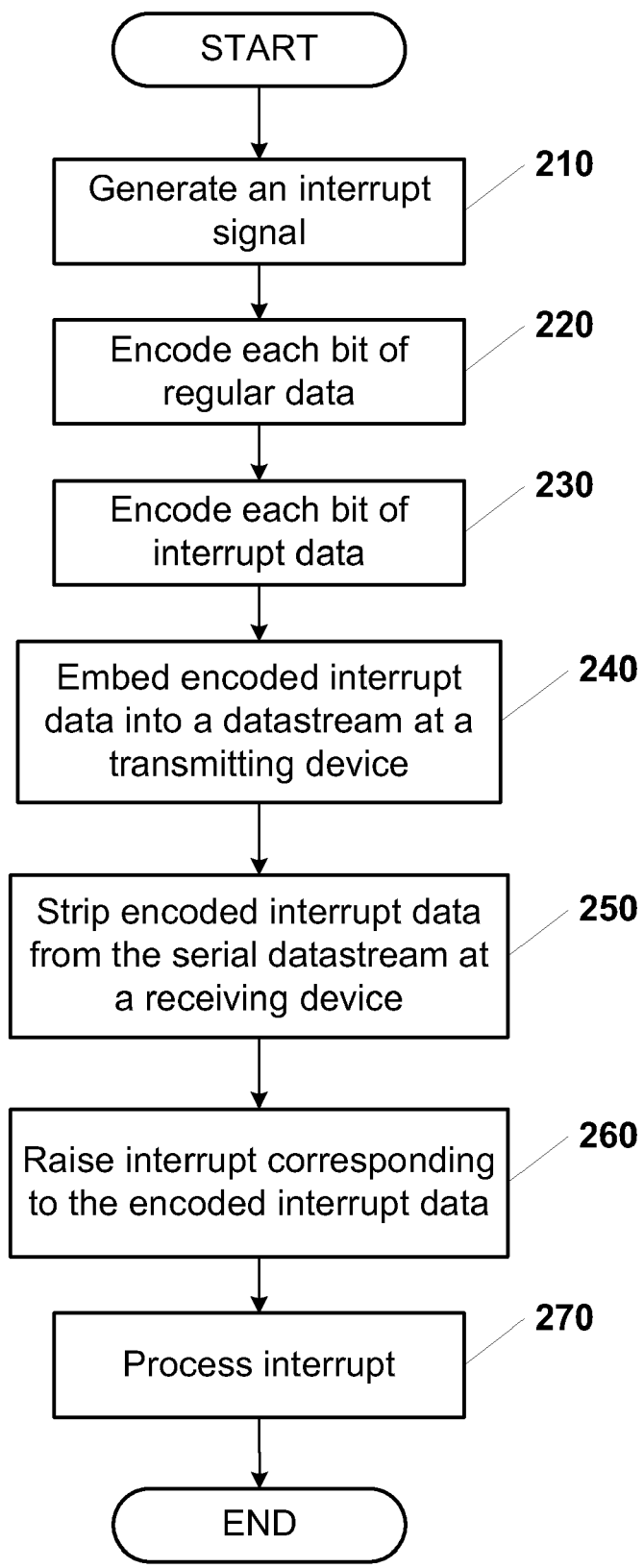
FIG. 2 illustrates a flow diagram of an example of logic of a control system.

FIG. 2 illustrates a flow diagram of an example of the logic of the control system 100. The logic may include additional, different, or fewer operations. The operations may be executed in a different order than illustrated in FIG. 2.

The operations may begin when an event is detected and an interrupt signal 102 is generated corresponding to the event (210). Each bit of regular data may be encoded into regular data symbols of two or more bits (220). Each bit of interrupt data may be encoded into interrupt data symbols of two or more bits (230). The regular data symbols and the interrupt data symbols may form disjoint sets. Encoded interrupt data may be embedded into the serial datastream 106 of encoded regular data, which is transmitted from a transmitting device, such as the fixture 108 illustrated in FIG. 1, to a receiving device, such as the controller 112, at the next available symbol boundary (240).

The encoded interrupt data may be stripped from the serial datastream 106 at the receiving device (250). An interrupt corresponding to the instance of encoded interrupt data may be raised in the receiving device (260). The interrupt may be processed by interrupting normal processing to run an interrupt subroutine or the interrupt handler 118 (270).

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which may include CD-ROMs, volatile or non-volatile memory such as ROM and RAM, or any other suitable storage device. Moreover, the various module functionality is but one example of such functionality and any other configurations encompassing similar functionality are possible. For example, the CPU 142 of the remote driver 110 may execute the interrupt handler 118 instead of the controller 112. Although selected components of the implementations, such as the interrupt handler 118 are depicted as being implemented as computer executable instructions, such components be implemented as one or more electronic circuits.

Furthermore, although specific components of innovations were described, methods, systems, and articles of manufacture consistent with the innovation may include additional, fewer, or different components. For example, the interrupt source 122, the fixture 108, the controller 112, or any other component may include additional, fewer, or different components. In another example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, or other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A method of transmitting and processing interrupts comprising:
   detecting an event and generating an interrupt signal corresponding to said event,
   converting said interrupt signal into a special interrupt character sequence,
   embedding said special interrupt character sequence into a serial data stream transmitted from a transmitting device to a receiving controller at a next available character boundary,
   stripping said special interrupt character sequence from said serial data stream at said receiving controller,
   raising a second interrupt in said receiving controller corresponding to said special interrupt character sequence, and
   processing said second interrupt by interrupting normal processing to run an interrupt subroutine,
   wherein said event is unrelated to transmission of said serial data stream, wherein said transmitting device and said receiving controller are components of a lighting system for areal illumination comprising said receiving controller and a plurality of fixtures, wherein said fixtures comprise at least one of a plurality of luminaires, a control device, or a standalone sensor, and wherein said transmitting device is included in one of said fixtures;

wherein each of said luminaires comprises a light source whose output light level is adjustable, wherein a light sensor co-located with each of said luminaires is configured to measure light, and the output of said light sensor is transmitted over wires to said receiving controller; and wherein said receiving controller is configured to provide bidirectional communication with said fixtures, and wherein said receiving controller is further configured to power said light sources of said luminaires.

2. The method of claim 1, further comprising embedding a special acknowledgment character sequence into a return serial data stream from said receiving controller to said transmitting device at a next available character boundary in the return serial data stream, stripping said special acknowledgement character sequence from said return serial data stream at said transmitting device, and re-embedding and retransmitting said special interrupt character sequence at said transmitting device if said special acknowledgement character sequence is not received from said receiving controller within a predetermined period of time.

3. The method of claim 2, further comprising disabling transmission of additional special interrupt character sequences if said special acknowledgement character sequence is received within said predetermined period of time, embedding a special re-enable character sequence into said return serial data stream from said receiving controller to said transmitting device, stripping said special re-enable character sequence from said return serial data stream at said transmitting device, and re-enabling transmission of said additional special interrupt character sequences in response to receipt of said special re-enable character sequence at said transmitting device.

4. A method of transmitting and processing regular data and interrupt data comprising detecting an interrupt signal corresponding to an event, the interrupt signal detected at a fixture in a lighting system for areal illumination, encoding each bit of regular data into encoded regular data comprising regular data symbols of two or more bits, encoding each bit of interrupt data into encoded interrupt data comprising interrupt data symbols of two or more bits, wherein said regular data symbols and said interrupt data symbols form disjoint sets, embedding said encoded interrupt data into a serial data stream of said encoded regular data transmitted from said fixture to a controller of a remote driver in the lighting system, wherein said encoded interrupt data is embedded at a next available symbol boundary in said serial data stream, wherein said controller of the remote driver is configured to provide bidirectional communication with said fixture and the remote driver is further configured to provide power to said fixture in the lighting system, stripping said encoded interrupt data from said serial data stream at said controller, raising an interrupt in said controller of the remote driver in response to receipt of said encoded interrupt data from said fixture, and processing said interrupt by interrupting normal processing and running an interrupt subroutine.

5. The method of claim 4, wherein each of said regular data symbols are two bits long.

6. The method of claim 4, wherein each of said interrupt data symbols are two bits long.

7. The method of claim 4, wherein each of said interrupt data symbols are three bits long.

8. The method of claim 4, wherein each of said interrupt data symbols are four bits long.

9. A system for rapid response to events comprising:

a first digital processor configured to receive an interrupt signal and convert said interrupt signal into a special interrupt character sequence, wherein the first digital processor is included in a first device in a lighting system for areal illumination, the first digital processor is configured to receive the interrupt signal from a sensor in the lighting system, and the interrupt signal indicates the sensor detected an event, and a communications means configured to transmit a serial data stream from said first digital processor to a second digital processor of a second device in the lighting system, wherein the first digital processor is further configured to embed said interrupt character sequence into the serial data stream, wherein said special interrupt character sequence is stripped from said serial data stream at said second digital processor of the second device in the lighting system, an interrupt is raised in said second digital processor corresponding to said special interrupt character sequence, and wherein, in response to the interrupt, normal processing in said second digital processor is interrupted to run an interrupt subroutine for the event detected by the sensor in the lighting system.

10. The system of claim 9, wherein the signal source comprises a sensor.

11. The system of claim 9, wherein the second device includes a remote driver configured to turn on lights in the lighting system in response to the interrupt.

12. An apparatus for responding to remote events comprising:

a processor; and a memory comprising computer code executable with the processor to:

receive a serial data stream over a serial communications channel from a device in a lighting system, wherein the device converts an interrupt signal received at the device into a special interrupt character sequence and embeds the special interrupt character sequence into the serial data stream, and wherein the interrupt signal corresponds to an event detected by a sensor in the lighting system;

strip the special interrupt character sequence from the serial data stream; and raise an interrupt in the processor in response to receipt of the special interrupt character sequence, wherein the interrupt indicates the processor is to respond to the event detected by the sensor in the lighting system.

13. The apparatus of claim 12 wherein the sensor is a motion detector.

14. The apparatus of claim 12 wherein the computer code is further executable with the processor to set a light level of a light in the lighting system in response to the interrupt.

* * * * *